3,017,272
FEED COMPOSITIONS

Paul Van Dijck and Hendrik Eyssen, Kessel-Lo, Belgium, assignors to Recherche et Industrie Therapeutiques, Genval, Belgium, a corporation of Belgium
No Drawing. Filed Nov. 25, 1959, Ser. No. 855,262
13 Claims. (Cl. 99—2)

This invention is concerned with compositions and methods useful for improving the meat producing potential of animal feeds. More particularly, it relates to animal feeds fortified with Staphylomycin (U.S. registered trademark), compositions for preparing and methods of using such feeds.

It is well known that many additives to the diet of meat producing animals increase the growth rate of the animals thereby enabling the grower to realize substantial saving in profit received per animal pound. A few additives are alleged to increase the feed efficiency however most of these probably work by a pharmacodynamic mechanism usually following injection such as the antithyroid or hormonal agents. Many of these agents furthermore leave dangerous residues in the animals particularly the hormones, for instance diethylstilbesterol.

The compositions and methods of this invention have as their active ingredient the antibiotic Staphylomycin or "antibiotic 899." The physical properties, purity and production of Staphylomycin have been fully described in Antibiotics and Chemotherapy, 5, 632 (1955); 7, 606 (1957), and in the copending patent application, Serial No. 758,483. The amounts of Staphylomycin referred to hereafter relate to the commercial product described in these references or alternatively and preferably concentrates, adsorbates or mycelia derived from *Streptomyces virginiae* broth especially *Streptomyces virginiae* 899 (ATCC No. 13161) titrated into equivalent metric weights of Staphylomycin activity.

The novel compositions of this invention are useful in improving the growth rate and feed efficiency in meat-producing fowls and animals generally such as in chickens, ruminants and, advantageously, swine. It is well known that chlortetracycline supplemented feed is equivalent or superior to any prior art supplemented food in improving the growth of meat producing animals. The compositions of this invention containing Staphylomycin however have proved much superior to chlortetracycline containing feed particularly in improving the feed efficiency of the growing animals. In other words, the animals grow more per unit of feed than do those fed prior art compositions. This novel discovery is particularly outstanding when feeding growing swine as will be illustrated hereafter.

The supplemented feeds according to this invention will contain from about 1 to 200 grams of Staphylomycin or its equivalent per ton of normal basal animal food of any grain based mixture. As an example of the advantageous swine feeds are those having dispersed uniformly therein from about 2–200 grams of Staphylomycin per ton of basal feed preferably from about 5–50 grams per ton. Exemplary of supplemented feed for poultry are feed compositions containing from about 1–100 grams of Staphylomycin per ton of standard poultry feed; preferably from about 2–50 grams per ton.

These feed compositions are administered to growing meat producing animals orally. Alternatively but less desirably, Staphylomycin can be administered in the water given to animals or as special ration. The ranges mentioned are those generally useful and others have been found to have little further advantage.

Commercially, Staphylomycin is, most conveniently, sold to feed manufacturers as a prime composition containing from about 1–20 grams of Staphylomycin or its equivalent per pound of carrier, preferably about 2–10 grams per pound. The carrier can be any inert food ingredient or grain derived carrier usually administered to animals such as dried fermentation residue, cereal meals, grains or hulls such as soybean meal, corn meal or rice hulls. Other ingredients can be optionally added to the mixtures at will such as vitamines for example $B_{12}$ factors, other antibiotics or any conventional additives. Fermentation residues are particularly useful because of their residual $B_{12}$ activity. The premix composition is then uniformly mixed with standard growing feeds such as that of U.S. Patent 2,871,122, Example 1, in the proportions mentioned above. The resulting feed mixtures are fed to the growing animals in standard manner, such as being placed in their feed hoppers for consumption ad libitum.

Alternatively, but less preferably related antibiotics such as streptogramin, PA114 and E129 can be substituted for Staphylomycin in the composition described above. Following are experiments which demonstrate the use of the compositions of this invention as well as the marked advantage over the additive feeds previously used.

EXAMPLE 1

A basal feed mixture of a standard 16% protein, corn, soybean meal ration fortified with vitamins and minerals combined with additives as shown below was fed to two replicates of Hampshire swine at each level. All weights are expressed in pounds.

| Pig # | Sex | Starting Weight | End Weight | Gain | Pig Days | Average Daily Gain |
|---|---|---|---|---|---|---|
| BASAL RATION WITH NO ADDITIVE Replicate I | | | | | | |
| 262 | F | 38 | 133 | 95 | 69 | 1.38 |
| 350 | F | 31 | 121 | 90 | 69 | 1.30 |
| 1320 | F | 29 | 116 | 87 | 69 | 1.26 |
| 430 | M | 30 | 96 | 66 | 69 | .95 |
| 1303 | M | 31 | 100 | 69 | 69 | 1.00 |
| Replicate II | | | | | | |
| 390 | F | 34 | Pig was removed after 1 week on expt. due to prolapse of rectum | | | |
| 342 | F | 34 | 121 | 87 | 69 | 1.26 |
| 344 | M | 24 | 92 | 68 | 69 | .98 |
| 381 | M | 26 | 92 | 66 | 69 | .96 |
| 292 | M | 36 | 137 | 101 | 69 | 1.46 |

Total gain=729 lbs.
Total average daily gain=1.16 lbs.
Total feed consumed=2325 lbs.
Feed efficiency for two replicates=3.18 pounds per pound gain.

| Pig # | Sex | Starting Weight | End Weight | Gain | Pig Days | Average Daily Gain |
|---|---|---|---|---|---|---|
| BASAL RATION WITH 40 GMS. OF AUREOMYCIN PER TON Replicate I | | | | | | |
| 360 | F | 38 | 129 | 91 | 69 | 1.32 |
| 392 | F | 30 | 130 | 100 | 69 | 1.44 |
| 376 | F | 29 | 116 | 87 | 69 | 1.26 |
| 274 | M | 30 | 125 | 95 | 69 | 1.38 |
| 341 | M | 30 | 85 | 55 | 69 | .79 |
| Replicate II | | | | | | |
| 212 | F | 34 | 97 | 63 | 69 | .91 |
| 293 | F | 33 | 132 | 99 | 69 | 1.43 |
| 320 | M | 25 | 119 | 94 | 69 | 1.36 |
| 262 | M | 27 | 120 | 93 | 69 | 1.35 |
| 263 | M | 34 | 130 | 96 | 69 | 1.39 |

Total gain=873 lbs.
Total average daily gain=1.26 lbs.
Total feed consumed=2724 lbs.
Feed efficiency for two replicates=3.12 pounds per pound gain.

| Pig # | Sex | Starting Weight | End Weight | Gain | Pig Days | Average Daily Gain |
|---|---|---|---|---|---|---|
| BASAL RATION WITH 20 GMS. OF STAPHYLOMYCIN PER TON ||||||| 
| Replicate I ||||||| 
| 320 | F | 35 | 137 | 102 | 69 | 1.47 |
| 1302 | F | 31 | 124 | 93 | 69 | 1.34 |
| 280 | F | 27 | 101 | 74 | 69 | 1.07 |
| 383 | M | 28 | 112 | 84 | 69 | 1.22 |
| 353 | M | 32 | 114 | 109 | 69 | 1.57 |
| Replicate II ||||||| 
| 393 | F | 34 | 140 | 106 | 69 | 1.54 |
| 401 | F | 33 | 107 | 74 | 69 | 1.07 |
| 271 | F | 26 | 114 | 88 | 69 | 1.27 |
| 264 | M | 28 | 117 | 89 | 69 | 1.28 |
| 352 | M | 33 | 125 | 92 | 69 | 1.33 |

Total gain=911 lbs.
Total average daily gain=1.316 lbs.
Total feed consumed=2,658 lbs.
Feed efficiency for two replicates=2.92 pounds per pound gain.

| Pig # | Sex | Starting Weight | End Weight | Gain | Pig Days | Average Daily Gain |
|---|---|---|---|---|---|---|
| BASAL RATION WITH 40 GMS. OF STAPHYLOMYCIN PER TON ||||||| 
| Replicate I ||||||| 
| 374 | F | 36 | 126 | 90 | 69 | 1.30 |
| 233 | F | 31 | 157 | 126 | 69 | 1.82 |
| 420 | F | 27 | 116 | 89 | 69 | 1.28 |
| 272 | M | 30 | 136 | 106 | 69 | 1.53 |
| 325 | M | 31 | 142 | 111 | 69 | 1.61 |
| Replicate II ||||||| 
| 351 | F | 35 | 136 | 101 | 69 | 1.46 |
| 210 | F | 32 | 132 | 100 | 69 | 1.48 |
| 1123 | F | 27 | 116 | 89 | 69 | 1.28 |
| 260 | M | 28 | 121 | 93 | 69 | 1.35 |
| 340 | M | 32 | 146 | 114 | 69 | 1.65 |

Total gain=1019 lbs.
Total average daily gain=1.476 lbs.
Total feed consumed=2927 lbs.
Feed efficiency for two replicates=2.87 pounds per pound gain.

It will be noted that the feed efficiency is much improved with the Staphylomycin mixes compared with the basal ration or with the chlortetracycline ration. The 20 gm. per ton Staphylomycin ration gives a statistically significantly improved feed efficiency index than did the 40 mg. chlortetracycline mix. The chlortetracycline group did not demonstrate a feed efficiency index higher than the controls but did show an increased food intake and growth response over the controls.

EXAMPLE 2

A basal growing mark having the following formula was administered to broilers with and without additives as noted in groups of 40 male birds in 4 replicates at each test: All weights are in grams.

*Basal formula*

Ingredient: Percent
  Grd. yellow corn _____ 46.45
  Pulv. oats _____ 1.0
  Std. wheat middlings _____ 1.0
  Stab. animal fat _____ 6.94
  17% Dehyd. alfalfa meal _____ 2.0
  51% Dehulled soybean meal _____ 31.32
  50% meat scraps _____ 2.50
  Corn fermentation solubles _____ 2.00
  Dried whey (50% delactose) _____ 2.00
  Fish meal (with fish sol) "Vitaproil" __ 2.00
  Plus added vitamins, minerals and proteins.

| 2 wks. wt. | 5 wks. wt. | 8 wks. wt. | Percent increase over controls | No. at 8 wks. |
|---|---|---|---|---|
| BASAL FORMULA WITH NO ADDITIVE |||||
| 215 | 738 | 1,349 | ---- | 38 |
| PENICILLIN (4 GMS. PER TON) |||||
| 221 | 744 | 1,354 | 0.37 | 39 |
| BACITRACIN (4 GMS. PER TON) |||||
| 229 | 740 | 1,365 | 1.19 | 36 |
| CHLORTETRACYCLINE (10 GMS. PER TON) |||||
| 219 | 726 | 1,364 | 1.12 | 39 |
| STAPHYLOMYCIN (2 GMS. PER TON) |||||
| 218 | 245 | 1,382 | 2.45 | 36 |
| STAPHYLOMYCIN (4 GMS. PER TON) |||||
| 231 | 465 | 1,412 | 4.67 | 37 |
| STAPHYLOMYCIN (10 GMS. PER TON) |||||
| 233 | 762 | 1,378 | 2.15 | 37 |

EXAMPLE 3

Using a commercial common breed of broiler chick instead of the heavy breed employed in Example 2, comparative experiments have been performed as follows with the hereafter described composition as basal feed mixture. Each group contained 50 animals. All weights are expressed in grams.

*Basal formula*

Ingredient: Percent
  Wheat meal _____ 5
  Milk powder _____ 2
  Liver meal _____ 1
  Fish meal _____ 6
  Meat meal _____ 5
  Extracted soybean meal _____ 6
  Extracted sunflower meal _____ 6
  Millet _____ 30
  Corn meal _____ 29
  Oatmeal _____ 5
  Plus added vitamins and minerals compositions __ 5

(Characteristics of this feed composition are: proteins, 20.25% and starch value, 68.92%.)

| 3 days wt. | 17 days wt. | 31 days wt. | Percent increase over controls | Feed Efficiency (gms. per gm. gain) |
|---|---|---|---|---|
| BASAL FORMULA WITH NO ADDITIVE ||||||
| 45.8 | 152.6 | 332 | ---------- | 2.704 |
| STAPHYLOMYCIN (10 GMS. PER TON) |||||
| 46.0 | 163.4 | 376 | 15.3 | 2.523 |
| OXYTETRACYCLINE (10 GMS. PER TON) |||||
| 46.3 | 159.0 | 346 | 4.8 | 2.629 |
| PENICILLIN (4 GMS. PER TON) |||||
| 46.3 | 158.8 | 348 | 5.5 | 2.761 |

EXAMPLE 4

A synthetic basal feed mixture as described hereafter was fed to four groups of 30 one day-old broilers. A commercial common breed of broiler chick was used. All weights are expressed in grams.

*Basal formula*

Ingredients:
- Sucrose ------g-- 500
- Corn starch ------g-- 100
- Casein ------g-- 200
- Gelatin ------g-- 80
- Calcium gluconate ------g-- 50
- Cystin ------g-- 4
- Cholin chloride ------g-- 2
- Solutions of vitamins A, D and E in oil [1] ---g-- 10
- Vitamins dispersed in glucose [2] ------g-- 10
- Aqueous solution of vitamins [3] ------g-- 4
- Minerals:
    - Sodium chloride ------g-- 6
    - Potassium phosphate, dibasic ------g-- 6
    - Potassium phosphate, monobasic ------g-- 4.5
    - Magnesium sulfate ------g-- 2.5
    - Manganese sulfate ------mg-- 400
    - Ferric citrate ------mg-- 500
    - Cupric sulfate ------mg-- 20
    - Potassium iodide ------mg-- 6
    - Potassium bromide ------mg-- 8
    - Zinc acetate ------mg-- 14
    - Aluminium sulfate ------mg-- 16
    - Cobalt acetate ------mg-- 4
    - Nickel carbonate ------mg-- 2
    - Sodium molybdate ------mg-- 0.5

[1] 50 mg. of α-tocopherol acetate, 15,000 I.U. of vitamin A, 2,000 I.U. of vitamin $D_3$ up to 10 g. with corn oil.
[2] 1 g. of inositol, 10 g. of thiamine, 10 mg. of riboflavine, 10 mg. of pyridoxin hydrochloride, 50 mg. of niacin, 50 mg. of calcium pantothenate and 5 mg. of vitamin K in 8.865 g. of glucose.
[3] 5 mg. of folic acid, 0.2 mg. of biotin, 0.05 mg. of cyanocobalamin in 4 ml. of water (pH adjusted to 6.5 with sodium hydroxide).

| 1 day wt. | 7 days wt. | 14 days wt. | 21 days wt. | Percent increase over controls |
|---|---|---|---|---|
| BASAL FORMULA WITH NO ADDITIVE |||||
| 40.1 | 81.0 | 146.5 | 203 | ------ |
| STAPHYLOMYCIN (50 GMS. PER TON) |||||
| 39.9 | 89.6 | 163.5 | 232.2 | 18 |
| STAPHYLOMYCIN (10 GMS. PER TON) |||||
| 40.0 | 89.3 | 158.5 | 220.0 | 10.5 |
| CHLORTETRACYCLINE (10 GMS. PER TON) |||||
| 39.9 | 86.7 | 148.5 | 203.0 | ------ |

EXAMPLE 5

This experiment has been performed using the synthetic basal feed mixture and a breed of broiler chick such as that used in Example 4. Each group contained 25 animals. The different components of a Staphylomycin crude product, i.e. Factor S, Factor M and the microbiologically inactive residual product have been used in this comparative experiment. All weights are expressed in grams.

| 1 day wt. | 7 days wt. | 14 days wt. | 21 days wt. | Percent increase over controls |
|---|---|---|---|---|
| BASAL FORMULA WITH NO ADDITIVE |||||
| 41.2 | 83.5 | 138.5 | 218.5 | ------ |
| FACTOR S (50 GMS. PER TON) |||||
| 41.0 | 86.9 | 155 | 246.4 | 15.8 |
| FACTOR $M_1$ (50 GMS. PER TON) |||||
| 40.9 | 86.2 | 148.8 | 241.3 | 13 |
| MICROBIOLOGICALLY INACTIVE PRODUCT |||||
| 41.5 | 83.9 | 140.0 | 220.1 | 1.2 |

The results of Examples 3, 4 and 5 are not to be considered as aberrant versus those of Example 2 but as a confirmation thereof: it is, indeed, commonly admitted by the experts skilled in the dietetic art that less favorable conditions of growth due either to the animal or to the basal feed enhance the action of the antibiotic feed additives.

Basal growing rations for immature cattle and sheep is similarly uniformly dispersed with 20 g. Staphylomycin-equivalent *Streptomyces virginiae* mycelia per ton of ration and administered orally to the animals during their growing cycle.

What is claimed is:
1. An improved feed for meat-producing animals comprising a basal feed ration combined uniformly with from about 1 gram to about 200 grams of Staphylomycin per ton of basal feed ration.

2. The improved feed of claim 1 characterized in that said Staphylomycin is present as the mycelium cake obtained from a Staphylomycin producing micro-organism.

3. An improved feed for meat-producing animals comprising a basal feed ration combined uniformly with from about 1 gram to about 200 grams of at least one of the microbiologically active components of Staphylomycin.

4. A premix composition to be added uniformly to basal feed rations of meat-producing animals comprising a grain derived meal carrier combined uniformly with from about 1 gram to about 20 grams of at least one of the microbiologically active components of Staphylomycin per pound of said carrier.

5. The method of improving the feed efficiency index of meat-producing animals comprising dispersing at least one of the microbiologically active components of Staphylomycin uniformly in the basal feed ration of said animals to form a supplemental feed, the total amount of said microbiologically active components being from about 1 gram to about 200 grams per ton of basal feed ration, and administering said feed orally to said meat-producing animals.

6. An improved feed for swine comprising a basal ration combined uniformly with from about 5 grams to about 50 grams of Staphylomycin per ton of basal feed ration.

7. An improved feed for poultry comprising a basal feed ration combined uniformly with from about 2 grams to about 50 grams of Staphylomycin per ton of basal feed ration.

8. A premix composition to be added uniformly to the basal feed rations of meat-producing animals comprising Staphylomycin and a grain derived meal carrier, said Staphylomycin being present in from about 1 gram to about 20 grams per pound of said carrier.

9. A premix composition as described in claim 8 characterized in that said Staphylomycin is present as the mycelium cake obtained from a Staphylomycin producing micro-organism, said mycelium cake being present in sufficient quantities to furnish 1–20 grams of Staphylomycin per pound of said carrier.

10. The method of improving the feed efficiency index of growing meat-producing animals comprising dispersing Staphylomycin uniformly in the basal feed ration of said animals to form a supplemented feed and administering said feed orally to said meat-producing animals, said Staphylomycin being present in quantities from about 1 gram to about 200 grams per ton of said basal feed ration.

11. The method of claim 10 wherein said Staphylomycin is dispersed as the mycelium cake obtained from a Staphylomycin producing micro-organism.

12. The method of claim 10 characterized in that the animals are swine and Staphylomycin is present in from about 2–200 grams per ton of basal feed ration.

13. The method of claim 10 characterized in that the animals are chickens and Staphylomycin is present in from about 1–100 grams per ton of basal feed ration.

References Cited in the file of this patent

UNITED STATES PATENTS 2,929,711     Stokstad _____ Mar. 22, 1960

OTHER REFERENCES

Vanderhaeghe et al.: Antibiotics and Chemotherapy, 7 (1957), pp. 606–14.